(12) United States Patent
Ishikawa

(10) Patent No.: US 7,248,277 B2
(45) Date of Patent: Jul. 24, 2007

(54) METHOD AND APPARATUS FOR OPTICAL WRITING CAPABLE OF WRITING A WIDE FORMAT IMAGE USING A PLURALITY OF LIGHT EMITTING DEVICES

(75) Inventor: Naoichi Ishikawa, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 10/974,688

(22) Filed: Oct. 28, 2004

(65) Prior Publication Data

US 2005/0117133 A1    Jun. 2, 2005

(30) Foreign Application Priority Data

Oct. 29, 2003    (JP) .............................. 2003-368602

(51) Int. Cl.
B41J 2/45 (2006.01)
B41J 2/435 (2006.01)
(52) U.S. Cl. ...................... 347/238; 347/237; 347/247
(58) Field of Classification Search ........ 347/233–240, 347/246–254; 702/90
See application file for complete search history.

(56) References Cited

U.S. PATENT DOCUMENTS

| 5,429,441 | A |   | 7/1995  | Schulz et al. |        |
|-----------|---|---|---------|---------------|--------|
| 5,586,055 | A | * | 12/1996 | Ng et al. ..................... | 702/90 |
| 5,825,400 | A |   | 10/1998 | Florence      |        |
| 5,926,201 | A | * | 7/1999  | Fleming et al. ............. | 347/237 |
| 7,038,706 | B1| * | 5/2006  | Hiyoshi ...................... | 347/238 |
| 2004/0008247 | A1 |   | 1/2004 | Masuda |  |
| 2005/0117133 | A1 |   | 6/2005 | Ishikawa |  |

FOREIGN PATENT DOCUMENTS

| EP | 0 720 119 A2 | 7/1996 |
| JP | 10-086438 | 4/1998 |
| JP | 2003-118165 | 4/2003 |

OTHER PUBLICATIONS

Patent Abstracts of Japan, JP 08-118722, May 14, 1996.*
Tomoyoshi Tajiri, et al., "600 dpi/A3 LED Head of Current Control Compensation", OKI Technical Review, vol. 63, No. 158, XP-000699787, Apr. 1997, pp. 11-13.*
Tomoyoshi Tajiri, et al., "600 dpi/A3 LED Head of Current Control Compensation", OKI Technical Review, vol. 63, No. 158, XP-000699787, Apr. 1997, pp. 11-13.
U.S. Appl. No. 11/202,166, filed Aug. 12, 2005, Ishikawa.

* cited by examiner

Primary Examiner—Hai Pham
(74) Attorney, Agent, or Firm—Oblon, Spivak, McClelland, Maier & Neustadt, P.C.

(57) ABSTRACT

An image forming apparatus includes a plurality of light-emitting element array units, a light intensity control unit, and an image data transfer unit. Each light-emitting element array unit includes a plurality of light-emitting elements, and is arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions. The light intensity control unit controls light intensity of the light-emitting elements based on an overlapping degree of the adjacent two light-emitting elements at each of the overlapping portions. The image data transfer unit divides an input image data and transfers the respective image data to each one of the light-emitting element array units.

48 Claims, 7 Drawing Sheets

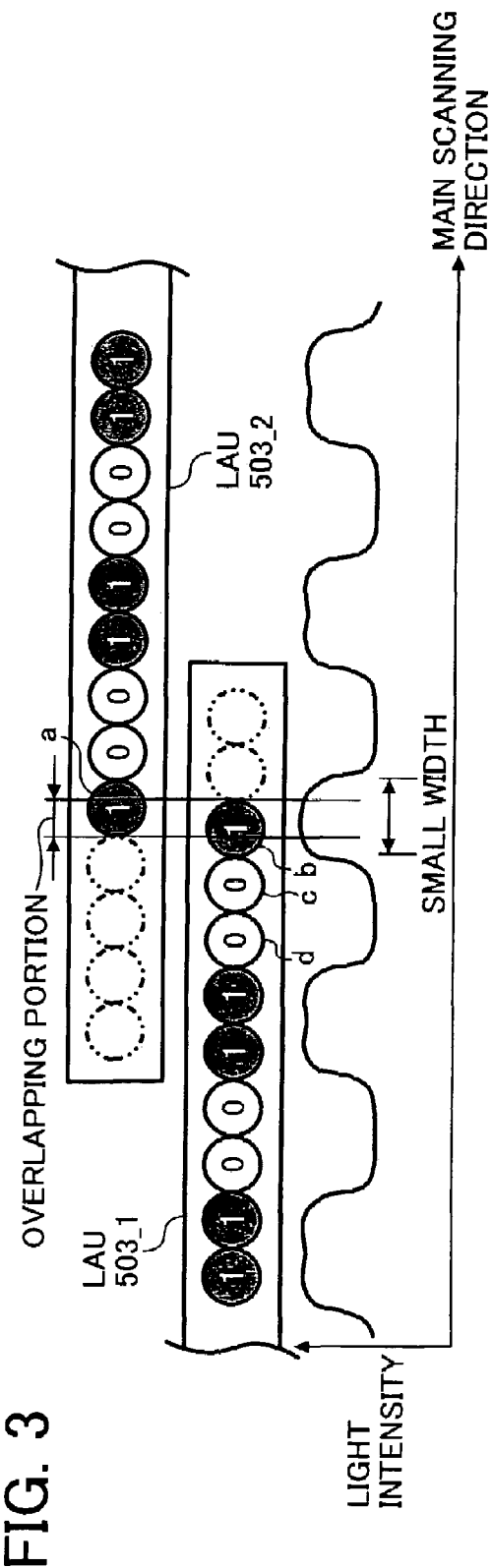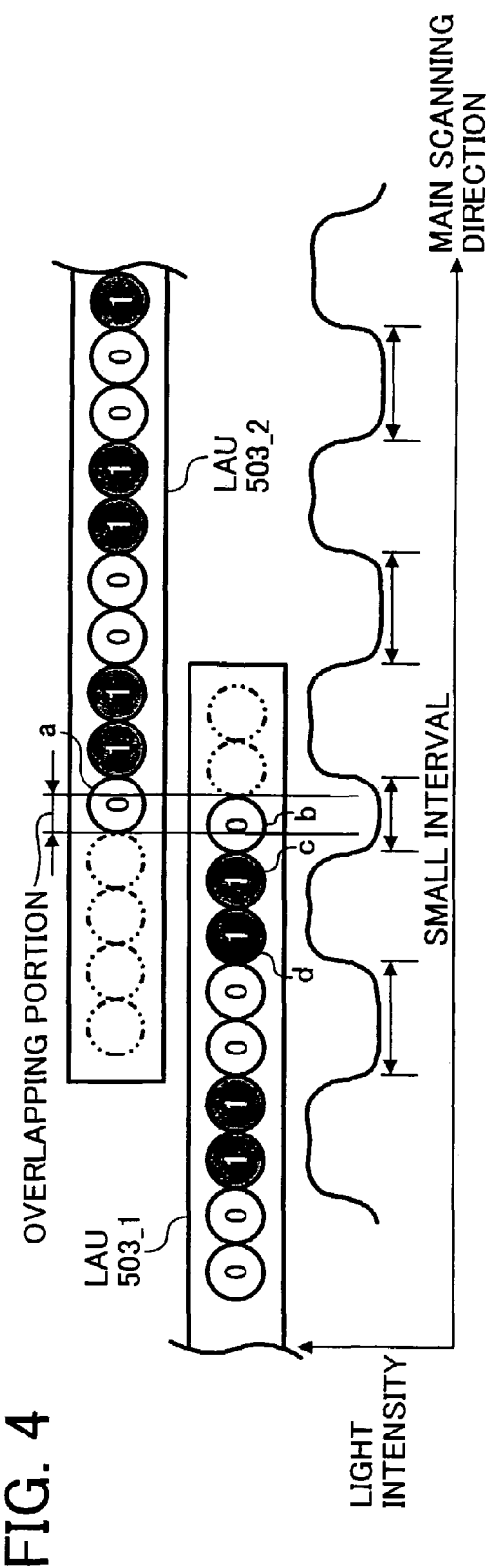

METHOD AND APPARATUS FOR OPTICAL WRITING CAPABLE OF WRITING A WIDE FORMAT IMAGE USING A PLURALITY OF LIGHT EMITTING DEVICES

BACKGROUND OF THE INVENTION

1. Field of the Invention

The present invention relates to an optical-writing apparatus, and more particularly to an optical-writing apparatus in which a plurality of LED (light emitting diode) array units are arranged in a staggered manner in a main scanning direction of a photoconductive member to expose respective regions of the photoconductive member.

2. Discussion of the Background

A background optical-writing apparatus employs an LD (laser-diode) scanning configuration or a light-emitting element array unit configuration, to write a latent image to a photoconductive member.

The LD scanning configuration includes a light source using a laser-diode to emit a laser beam, a polygon mirror, and a polygon motor that rotates the polygon mirror.

The light-emitting element array unit configuration includes a light source using light-emitting elements such as an LED (light emitting diode) to emit light, and the light-emitting elements are arranged in the light-emitting element array unit. Different from the LD scanning configuration, the light-emitting element array unit configuration can realize a higher reliability of its performance because it has no movable components such as a polygon mirror.

Furthermore, the light-emitting element array unit configuration requires no space for scanning a light beam to a main scanning direction that is required for the LD scanning configuration. Instead, the light-emitting element array unit configuration uses, for example, an LED array unit that integrates a plurality of optical elements including LEDs, self-focus lenses (e.g., a SELFOC lens manufactured by Nippon Sheet Glass Co., Ltd.). Thus, an image forming apparatus employing the light-emitting element array unit configuration can miniaturize its size.

Therefore, an image forming apparatus used for printing a wide format such as an A0-sized format has been adopting the light-emitting element array unit configuration instead of the LD scanning configuration. However, the light-emitting element array unit configuration needs an LED array unit that is longer than an image-writing width.

In a case of an image forming apparatus being used for printing a wide format such as an A0-sized format, a relatively long light-emitting element array unit that can cover the wide format such as an A0-sized format is required, resulting in an increase in the needed number of LED driver ICs (integrated circuits). Consequently, a production yield of the light-emitting element array unit decreases.

Furthermore, the relatively long light-emitting element array unit inevitably requires components that have higher precision than a relatively small light-emitting element array unit used for a relatively small image forming apparatus to secure a high precision level of writing to a photoconductive member. Consequently, the relatively long light-emitting element array unit becomes expensive. Furthermore, such an expensive light-emitting element array unit as a whole is needed to be replaced in an event that even a single LED is damaged in the light-emitting element array unit.

Accordingly, using a relatively long light-emitting element array unit is unfavorable from a viewpoint of overall cost.

In view of the above-mentioned drawbacks, a background technique uses a plurality of light-emitting element array units used for a relatively small image forming apparatus, and arranges them in a main scanning direction of an image forming apparatus used for printing a wide format such as an A0-sized format. For example, a background image forming apparatus arranges two or three light-emitting element array units including light-emitting elements such as an LED (light emitting diode) in parallel to an axial direction (i.e., main scanning direction) of a photoconductive member. The light-emitting element array units expose respective surface regions of the photoconductive member.

In a case of a background image forming apparatus used for printing a wide format such as an A0-sized format, three light-emitting element array units used for an A3-sized format are arranged in parallel to a main scanning direction in a staggered manner so that a total length of the three light-emitting element array units can cover a wide format such as an A0-sized format. The three light-emitting element array units expose respective surface regions of the photoconductive member in the main scanning direction. In this way, the image forming apparatus used for printing a wide format such as an A0-sized format is provided with a less expensive optical-writing apparatus.

In the above-mentioned configuration, a plurality of light-emitting element array units are arranged in a staggered manner in a main scanning direction while end portions of the light-emitting element array units overlap with each other. In a case of using three light-emitting element array units, an end portion of a first light-emitting element array unit and an end portion of a second light-emitting element array unit overlap with each other, and another end portion of the second light-emitting element array unit and an end portion of a third light-emitting element array unit overlap with each other. Such end portions become joint portions for the three light-emitting element array units. In each of the light-emitting element array units, a plurality of LEDs are consecutively arranged.

The LEDs in the joint portions also need to be arranged consecutively, that is an LED at the joint portion of the first light-emitting element array unit and an LED at the joint portion of the second light-emitting element array unit need to be consecutive with each other so that image data for one main scanning line are securely written to the photoconductive member at such a joint portion. Similarly, an LED at the joint portion of the second light-emitting element array unit and an LED at the joint portion of the third light-emitting element array unit need to be consecutive with each other so that image data for one main scanning line are securely written to the photoconductive member at such a joint portion. The above-mentioned LED at the joint portion is referred to an "overlaying LED" hereinafter.

When viewing the overlaying LEDs from a sub-scanning direction of the photoconductive member, an overlapping degree of the overlaying LEDs of adjacent light-emitting element array units is within a range of zero (i.e, the minimum degree) to one LED (i.e, the maximum degree). The overlapping degree "zero LED" means that two overlaying LEDs do not overlap with each other, and the overlapping degree "one LED" means that two overlaying LEDs completely overlap with each other.

In an actual image forming apparatus, two overlaying LEDs inevitably overlap with each other with some overlapping degree within a range of zero to one LED. Depending on an overlapping degree of the two overlaying LEDs, light intensity at the joint portion varies. Consequently, an image formed based on such light intensity may result in a poor quality image in some cases.

To compensate for an effect caused by the above-mentioned overlapping, a background technique uses a multiple-value method to control an emission of the overlaying LEDs by adjusting light intensity of the overlaying LEDs. For example, when an emission of the overlaying LEDs are controlled by image data expressed in five-bits, light intensity of the overlaying LEDs can be changed gradationally in 32 levels, and the above-mentioned effect caused by the above-mentioned overlapping can be eliminated.

However, when an emission of the overlaying LEDs is controlled by image data expressed in a binary format taking a value of "0" or "1," light intensity of the overlaying LEDs cannot be changed gradationally, and the effect caused by the above-mentioned overlapping cannot be eliminated.

For example, as illustrated in FIG. 1, three LED array units 503_1 to 503_3 are arranged in an axial direction (i.e., the main scanning direction) of a photoconductive member in a staggered manner. Hereinafter the LED array units 503_1 to 503_3 are abbreviated as LAU 503_1 to 503_3. As illustrated in FIG. 1, the size of one LED represents one dot. A black dot means that an LED emits light and a white dot means that an LED does not emit light.

Hereinafter, for the clarity of explanation, four dots are designated as "a, b, c, and d" as illustrated in FIGS. 1 to 4.

To minimize the overlapping degree of overlaying LEDs, the LAUs 503_1 to 503_3 are positionally adjusted so that the overlaying dots "a" and "b" overlap with each other with an overlapping degree up to a full size of one dot.

FIGS. 2 to 4 illustrate examples of emitting conditions of dots arranged in the LAUs 503_1 to 503_3, which use the sample data sequence of "00110011" that repeats "00" and "11" in a toggle manner, and also illustrate light intensity waveforms corresponding to such a sample data sequence. In each example in FIGS. 2 to 4, an explanation is given by paying consideration to the dots "a, b, c, and d" that are placed consecutively.

FIG. 2 illustrates a case in which an overlapping degree of the overlaying dots "a" and "b" is relatively significant. As illustrated in FIG. 2, the dots "a, b, c, and d" take data of "1001", wherein the value of "1" means that an LED emits light and the value of "0" means that an LED does not emit light. In this case, as illustrated in the light intensity waveform in FIG. 2, an interval formed by a down-edge of the overlaying dot "a" and a down-edge of the dot "c" is relatively smaller compared to other intervals shown in FIG. 2. Thus, the dot "a" and the dot "c" interfere with each other. Consequently, human eyes may perceive a black image formed around the dots "a, b, c and d" to be darker than a black image formed in an area not affected by the dots "a, b, c and d."

FIG. 3 illustrates another case in which an overlapping degree of the overlaying dots "a" and "b" is relatively significant. As illustrated in FIG. 3, the dots "a, b, c, and d" take data of "1100." In this case, as illustrated in the light intensity waveform in FIG. 3, a width of the light intensity waveform (i.e., black width) at the overlaying dots "a" and "b" becomes relatively smaller compared to other light intensity waveform areas not affected by the overlaying dots "a" and "b," and thus black images corresponding to the overlaying dots "a" and "b" may shrink compared to other images not affected by the dots "a and b." Consequently, human eyes may perceive a shrinked black image formed around the dots "a" and "b".

FIG. 4 illustrates another case in which an overlapping degree of the overlaying dots "a" and "b" is relatively significant. As illustrated in FIG. 4, the dots "a, b, c, d" take data of "0011." In this case, both of the overlaying dots "a" and "b" take a value of 0, and thus an emission at the dot "a" and "b" cannot be compensated in any way. Consequently, human eyes may perceive a black image formed around the dots "a" and "b" to be darker than a black image formed in an area not affected by the dots "a" and "b".

The above-mentioned problem relating to the image quality is generally referred to as "black streak."

As explained above, an image quality control at the overlapping portion using image data taking a binary format is substantially difficult.

SUMMARY OF THE INVENTION

In view of the foregoing, it is an object of the present invention to provide a novel image forming apparatus in which a plurality of LED (light emitting diode) array units are arranged in a staggered manner in a main scanning direction of a photoconductive member to expose respective regions of the photoconductive member.

To achieve the above object, in one example, a novel image forming apparatus includes a plurality of light-emitting element array units configured to cover an area with a predetermined width, at least one light intensity control unit, and an image data transfer unit. Each one of the plurality of light-emitting element array units includes a plurality of light-emitting elements, and the plurality of light-emitting element array units are arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions. The at least one light intensity control unit controls light intensity of the plurality of light-emitting elements based on an overlapping degree of the adjacent two light-emitting elements at each of the overlapping portions. The image data transfer unit divides an input image data and transfers the respective image data divided for each one of the plurality of light-emitting element array units to the each one of the plurality of light-emitting element array units.

In the above-mentioned image forming apparatus, the predetermined width can be a wide format including an A0-sized format.

In the above-mentioned image forming apparatus, the input image data can be expressed in binary format and each bit of the input image data corresponds to each one of the plurality of light-emitting elements in the plurality of light-emitting element array units.

In the above-mentioned image forming apparatus, the at least one light intensity control unit includes a driving current controller configured to control a driving current to be input to the plurality of light-emitting elements.

The above-mentioned image forming apparatus may further include at least one light intensity correction unit configured to store a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

In the above-mentioned image forming apparatus, the light intensity correction data can be expressed in a multiple-bit format.

In the above-mentioned image forming apparatus, the plurality of light intensity correction data sets can be prepared by corresponding each one of the plurality of light intensity correction data to the overlapping degree of the adjacent two overlapping light-emitting elements at each of the overlapping portions.

In the above-mentioned image forming apparatus, the light intensity control unit can control the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

To achieve the above object, in one example, a novel method of image writing by using an image forming apparatus includes operations of installing, controlling, inputting, dividing, and transferring. The installing installs a plurality of light-emitting element array units configured to cover an area of a predetermined width, each one of the light-emitting element array units including a plurality of light-emitting elements, and the plurality of light-emitting element array units are arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions. The controlling controls light intensity of the plurality of light-emitting elements based on an overlapping degree of the adjacent two light-emitting elements at each of the overlapping portions. The inputting inputs image data to the image forming apparatus. The dividing divides the input image data. The transferring transfers the respective image data divided for each one of the plurality of light-emitting element array units to the each one of the plurality of light-emitting element array units.

Another object of the present invention to provide a novel optical-writing apparatus in which a plurality of LED (light emitting diode) array units are arranged in a staggered manner in a main scanning direction of a photoconductive member to expose respective regions of the photoconductive member.

To achieve the above another object, in one example, a novel optical-writing apparatus includes a plurality of light-emitting element array units configured to cover an area with a predetermined width, at least one light intensity control unit, and an image data transfer unit. Each one of the plurality of light-emitting element array units includes a plurality of light-emitting elements, and the plurality of light-emitting element array units are arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions. The at least one light intensity control unit controls light intensity of the plurality of light-emitting elements based on an overlapping degree of the adjacent two light-emitting elements at each of the overlapping portions. The image data transfer unit divides an input image data and transfers the respective image data divided for each one of the plurality of light-emitting element array units to the each one of the plurality of light-emitting element array units.

In the above-mentioned novel optical-writing apparatus, the predetermined width can be a wide format including an A0-sized format.

In the above-mentioned novel optical-writing apparatus, the input image data can be expressed in binary format and each bit of the input image data corresponds to each one of the plurality of light-emitting elements in the plurality of light-emitting element array units.

In the above-mentioned novel optical-writing apparatus, the at least one light intensity control unit can include a driving current controller configured to control a driving current to be input to the plurality of light-emitting elements.

The above-mentioned novel optical-writing apparatus may further include at least one light intensity correction unit configured to store a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

In the above-mentioned novel optical-writing apparatus, the light intensity correction data can be expressed in a multiple-bit format.

In the above-mentioned novel optical-writing apparatus, the plurality of light intensity correction data sets can be prepared by corresponding each one of the plurality of light intensity correction data to the overlapping degree of the adjacent two overlapping light-emitting elements at each of the overlapping portions.

In the above-mentioned novel optical-writing apparatus, the light intensity control unit can control the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

To achieve the above object, in one example, a novel method of image writing by using a novel optical-writing apparatus includes operations of installing, controlling, inputting, dividing, and transferring. The installing installs a plurality of light-emitting element array units configured to cover an area with a predetermined width, each one of the light-emitting element array units including a plurality of light-emitting elements, and the plurality of light-emitting element array units are arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with adjacent two overlapping light-emitting elements at each of the overlapping portions. The controlling controls light intensity of the plurality of light-emitting elements based on an overlapping degree of the adjacent two light-emitting elements at each of the overlapping portions. The inputting inputs image data to the image forming apparatus. The dividing divides the input image data. The transferring transfers the respective image data divided for each one of the plurality of light-emitting element array units to the each one of the plurality of light-emitting element array units.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an exemplary enlarged view of an overlapping portion of the LAUs arranged in the at-least-two-rows staggered manner in FIG. 1, and an exemplary state that two light-emitting elements at the overlapping portion of adjacent LAUs emit light;

FIG. 4 is an exemplary enlarged view of an overlapping portion of the adjacent LAUs arranged in the at-least-two-rows staggered manner in FIG. 1, and an exemplary state that light-emitting elements at the overlapping portion of the adjacent LAUs do not emit light;

DETAILED DESCRIPTION OF THE PREFERRED EMBODIMENTS

Figure 1:
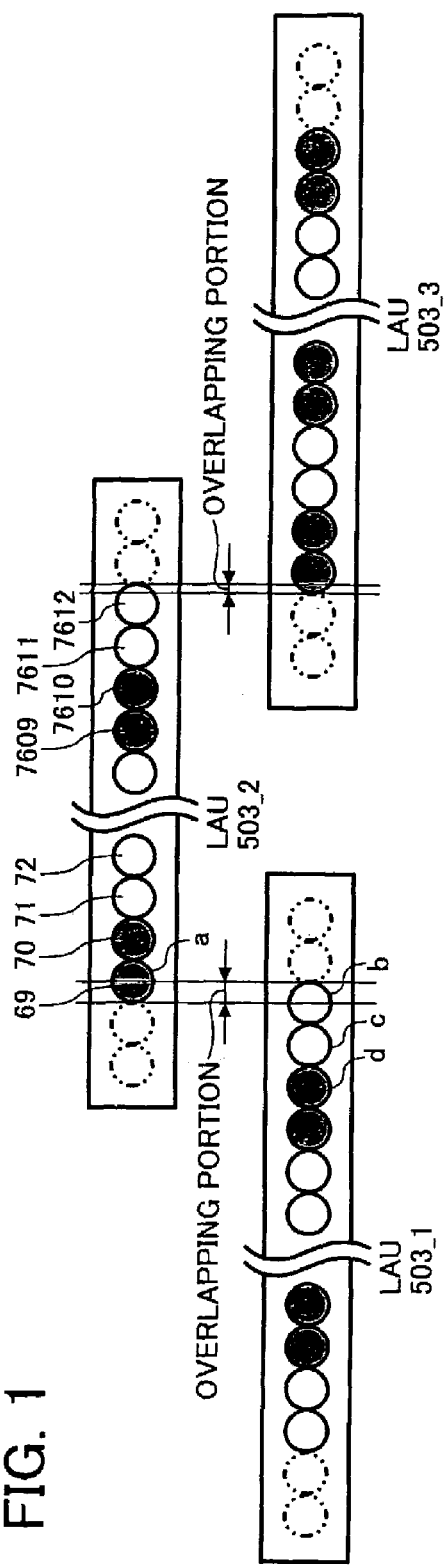
FIG. 1 is an exemplary configuration of LAUs arranged in an at-least-two-rows staggered manner.

In describing preferred embodiments illustrated in the drawings, specific terminology is employed for the sake of clarity. However, the disclosure of the present invention is not intended to be limited to the specific terminology so selected and it is to be understood that each specific element includes all technical equivalents that operate in a similar manner.

Figure 5:
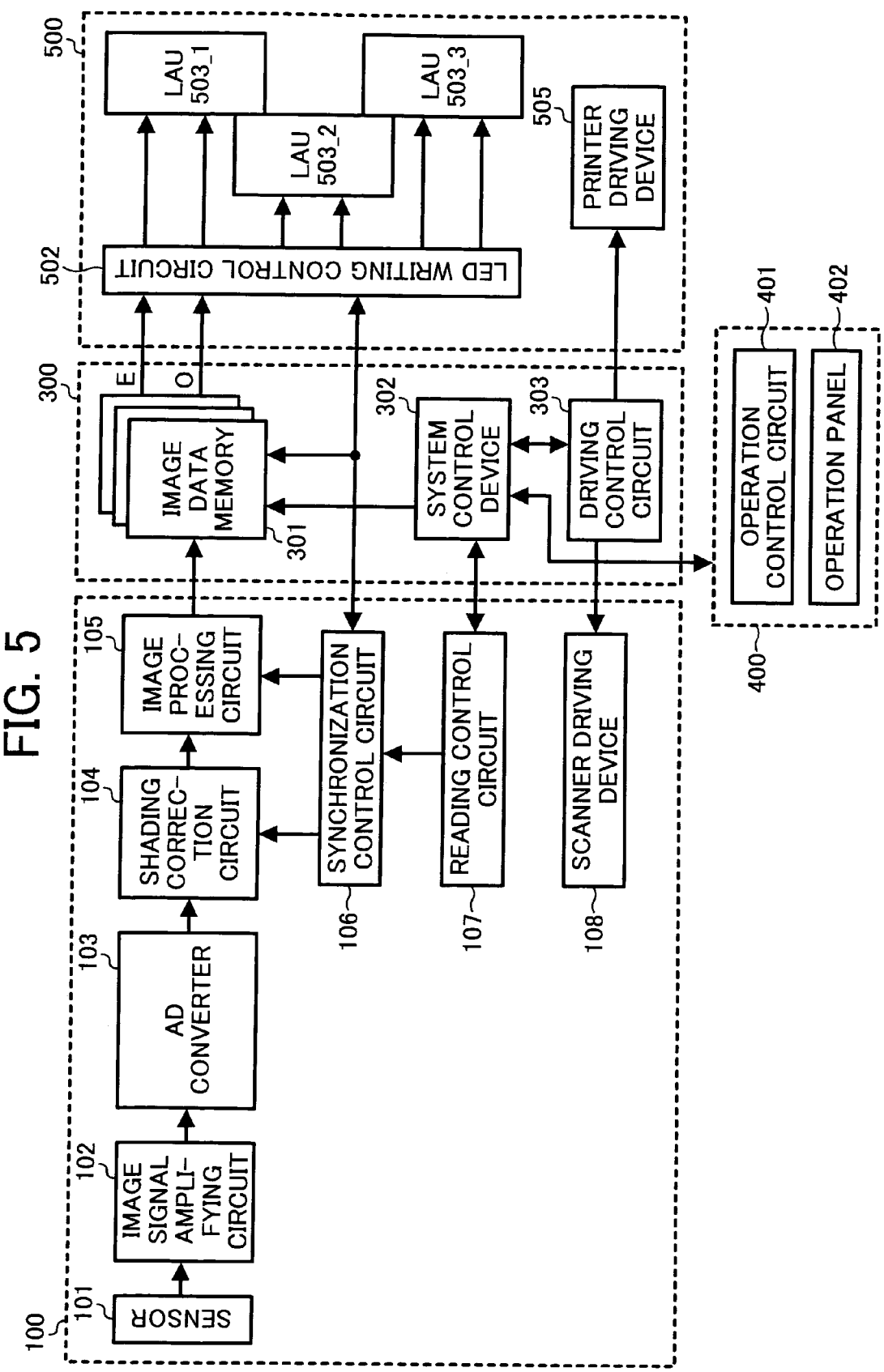
FIG. 5 is an exemplary configuration of an image forming apparatus having a optical-writing apparatus according to an exemplary embodiment of the present invention.

Referring now to the drawings, wherein like reference numerals designate identical or corresponding parts throughout the several views, and more particularly to FIG. 5 thereof, an exemplary configuration of an image forming apparatus having an optical-writing apparatus according to an exemplary embodiment of the present invention is described.

As illustrated in FIG. 5, the image forming apparatus includes an image reading unit 100, an image information memorizing unit 300, an operation unit 400, and a writing unit 500.

The image reading unit 100 includes a sensor 101, an image signal amplifying circuit 102, an analog to digital converter (AD converter) 103, a shading correction circuit 104, an image processing circuit 105, a synchronization control circuit 106, a reading control circuit 107, and a scanner driving device 108.

The image information memorizing unit 300 includes an image data memory 301, a system control device 302, and a driving control circuit 303.

The operation unit 400 includes an operation control circuit 401 and an operation panel 402.

The writing unit 500 includes an LED writing control circuit 502, LAUs 503_1 to 503_3, and a printer driving device 505.

The image reading unit 100 reads image information of a document. The image information memorizing unit 300 memorizes the image information of the document read by the image reading unit 100. The writing unit 500 transfers image information memorized by the image information memorizing unit 300 to a photoconductive member.

The system control device 302 controls a series of processes in the image forming apparatus, and receives information from an operator via the operation panel 402 of the operation unit 400.

Hereinafter, the image reading unit 100 will be explained with reference to FIGS. 5 and 6.

Figure 6:
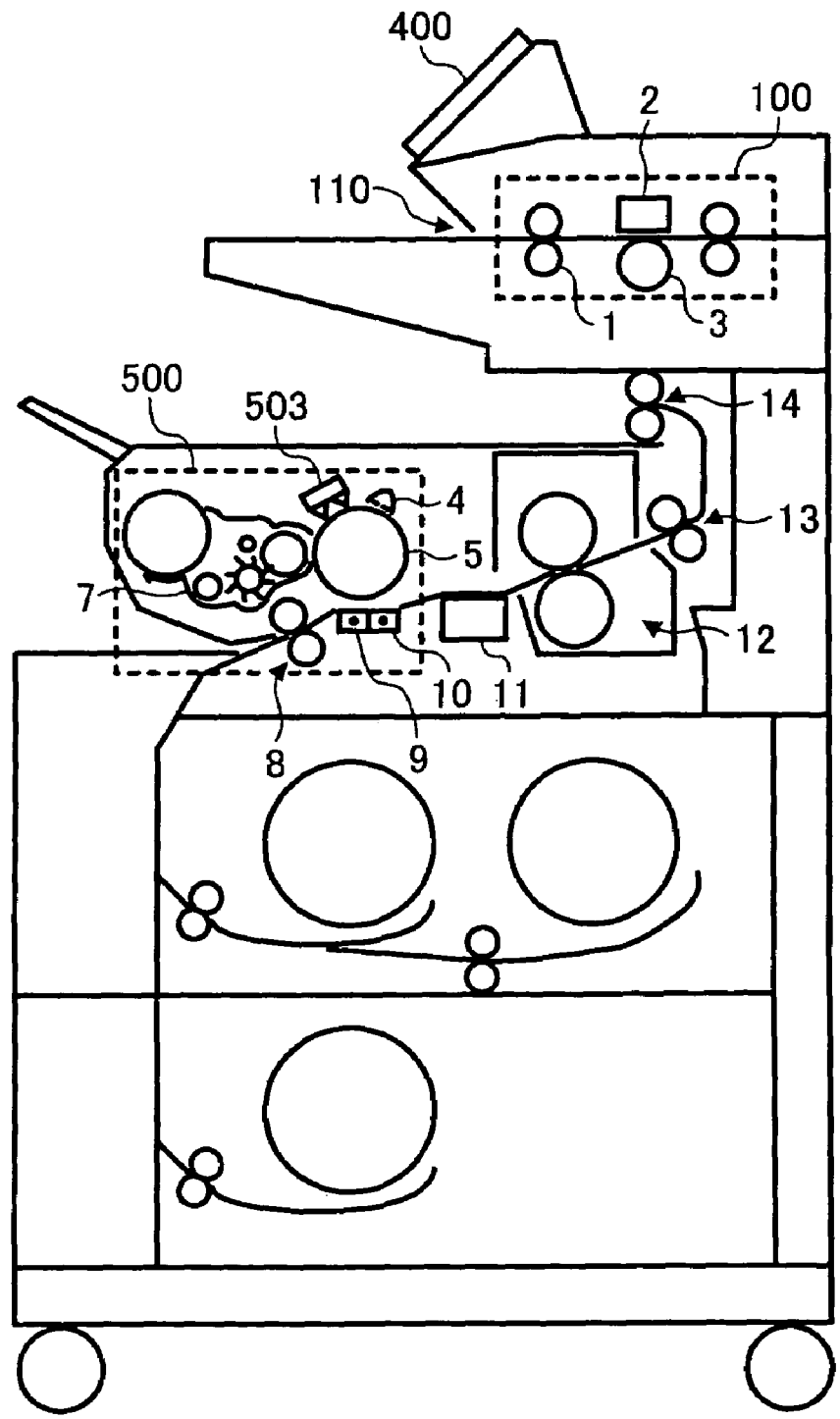
FIG. 6 is an exemplary cross-sectional view of an image forming apparatus having the optical-writing apparatus according to an exemplary embodiment of the present invention.

The image forming apparatus illustrated in FIG. 6 shows the image reading unit 100, the operation unit 400, the writing unit 500, a document feed port 110, a roller 1, a contact image sensor 2, a white roller 3, a transport tank 11, a fixing unit 12, and sheet ejection rollers 13 and 14.

The white roller 3 is coated in white, and defines a reference value of white color for the contact image sensor 2.

An operator feeds a document to the document feed port 110. The roller 1 transports the document to a space between the contact image sensor 2 and the white roller 3. The transported document is irradiated with light by an LED provided to the contact image sensor 2. A light reflected from the document is focused on the sensor 101 (FIG. 5) of the contact image sensor 2, and image information of the document is read by the contact image sensor 2. The image information focused on the sensor 101 of the contact image sensor 2 is converted to analog image signals. The analog image signals are transmitted to the image signal amplifying circuit 102 and amplified by the image signal amplifying circuit 102.

The AD converter 103 receives the analog image signals amplified by the image signal amplifying circuit 102 and converts the analog image signals into digital image signals. The AD converter 103 outputs the digital image signals to the shading correction circuit 104 by synchronizing them with a clock signal output from the synchronization control circuit 106.

The shading correction circuit 104 receives the digital image signals and corrects distortion of the digital image signals caused by uneven light intensity, stain on a contact glass, uneven sensitivity of a sensor, or the like. The digital image signals corrected by the shading correction circuit 104 are transmitted to the image processing circuit 105 and converted into digital image data by the image processing circuit 105. The digital image data is transmitted to the image data memory 301 and written therein.

Hereinafter, the system control device 302 and the writing unit 500 that controls a series of processes to transfer the digital image data written to the process image data memory 301 to a photoconductive member and consequently to a transfer sheet as a printed image will be explained.

The system control device 302 controls the whole operation of the image forming apparatus. The system control device 302 controls an image data transfer conducted by the reading control circuit 107, the synchronization control circuit 106, the image data memory 301, and the LED writing control circuit 502. The system control device 302 also controls the driving control circuit 303, which controls the scanner driving device 108 and the printer driving device 505 to drive a motor or the like, to control document reading and transport of a transfer sheet.

In the writing unit 500, the digital image data transmitted from the image data memory 301 with a synchronization signal clock are converted into data suitable for a data-transfer to the LAUs 503_1 to 503_3 by the LED writing control circuit 502. The data is converted to an infrared light in the LAUs 503_1 to 503_3, and is output from the LAUs 503_1 to 503_3.

With reference to FIG. 6, processes for transferring an image to a transfer sheet will be explained.

The writing unit 500 includes a charging device 4, a photoconductive member 5 in a drum shape, the LAUs 503_1 to LAU 503_3 (503 in FIG. 6), a developing unit 7, a registration roller 8, a transfer charger 9, and a separation charger 10.

The LAUs 503_1 to LAU 503_3 optically write image data to the photoconductive member 5. The charging device 4 includes a scorotron charger having a grid provided above a surface of the photoconductive member 5, and uniformly charges a surface of the photoconductive member 5 at a voltage of, e.g., −1,200V. A plurality of LEDs arranged in each of the LAUs 503_1 to LAU 503_3 irradiates laser light to a surface of the photoconductive member 5 through SLAs (SEFLOC lens array, e.g. an SEFLOC manufactured by Nippon Sheet Glass Co., Ltd.). When the LAUs 503_1 to LAU 503_3 irradiate laser light corresponding to digital image data to the surface of the photoconductive member 5, charges on the surface of the photoconductive member 5 irradiated by the laser light flow to a ground of the photoconductive member 5 due to photoconduction, and vanishes from the surface of the photoconductive member 5.

In this image forming apparatus, LEDs are configured not to emit light to an area corresponding to thin density in the document, and to emit light to an area corresponding to an area of thick density in the document.

Accordingly, an electrostatic latent image corresponding to density degrees of the document is formed on the surface of the photoconductive member 5. The electrostatic latent image is developed by the developing unit 7. In the developing unit 7, toner is agitated and negatively charged, and biased to a voltage of, e.g., −700 V. Therefore, the toner adheres only to a surface of the photoconductive member 5 irradiated by the laser light.

A transfer sheet is fed from sheet feed units or a manual sheet feed unit, for example. The transfer sheet is controlled with a predetermined timing at the registration roller 8 before passing through a space beneath the photoconductive member 5. When the transfer sheet passes through the space beneath the photoconductive member 5, a toner image is transferred to the transfer sheet from the photoconductive member 5 by the transfer charger 9.

The transfer sheet having the toner image formed thereon is separated from the photoconductive member 5 by the separation charger 10, and is transported by a transport tank 11 to a fixing unit 12 to fix the toner image on the transfer sheet. The transport tank 11 is one type of a transport belt having a box shape and using a suction fan to smoothly transport the transfer sheet. The transfer sheet having the fixed toner image is then ejected from the image forming apparatus by the sheet ejection rollers 13 and 14.

Hereinafter, image data transmission from the image information memorizing unit 300 to the writing unit 500 will be explained.

Binary image data, that is even data (E) and odd data (O), are transmitted from the image data memory 301 to the LED writing control circuit 502 through two parallel lines at a frequency of 25 MHz, for example. The LED writing control circuit 502 synthesizes the image data transmitted through two parallel lines, divides the synthesized image data into six portions, and allocates two portions to each of the LAUs 503_1 to 503_3 at a frequency of 9.5 MHz, for example.

For example, assume data "0000000100100001101000101" formed of even data (E) and odd data (O) is transmitted with a same clock signal. The data "0000000100100001101000101" is divided into six portions: two portions for LAU 503_1, two portions for LAU 503_2, and two portions for LAU 503_3. That is, "0000" and "0001" are allocated for the LAU 503_1, "0010" and "0011" are allocated for the LAU 503_2, and "0100" and "0101" are allocated for the LAU 503_3.

Figure 7:
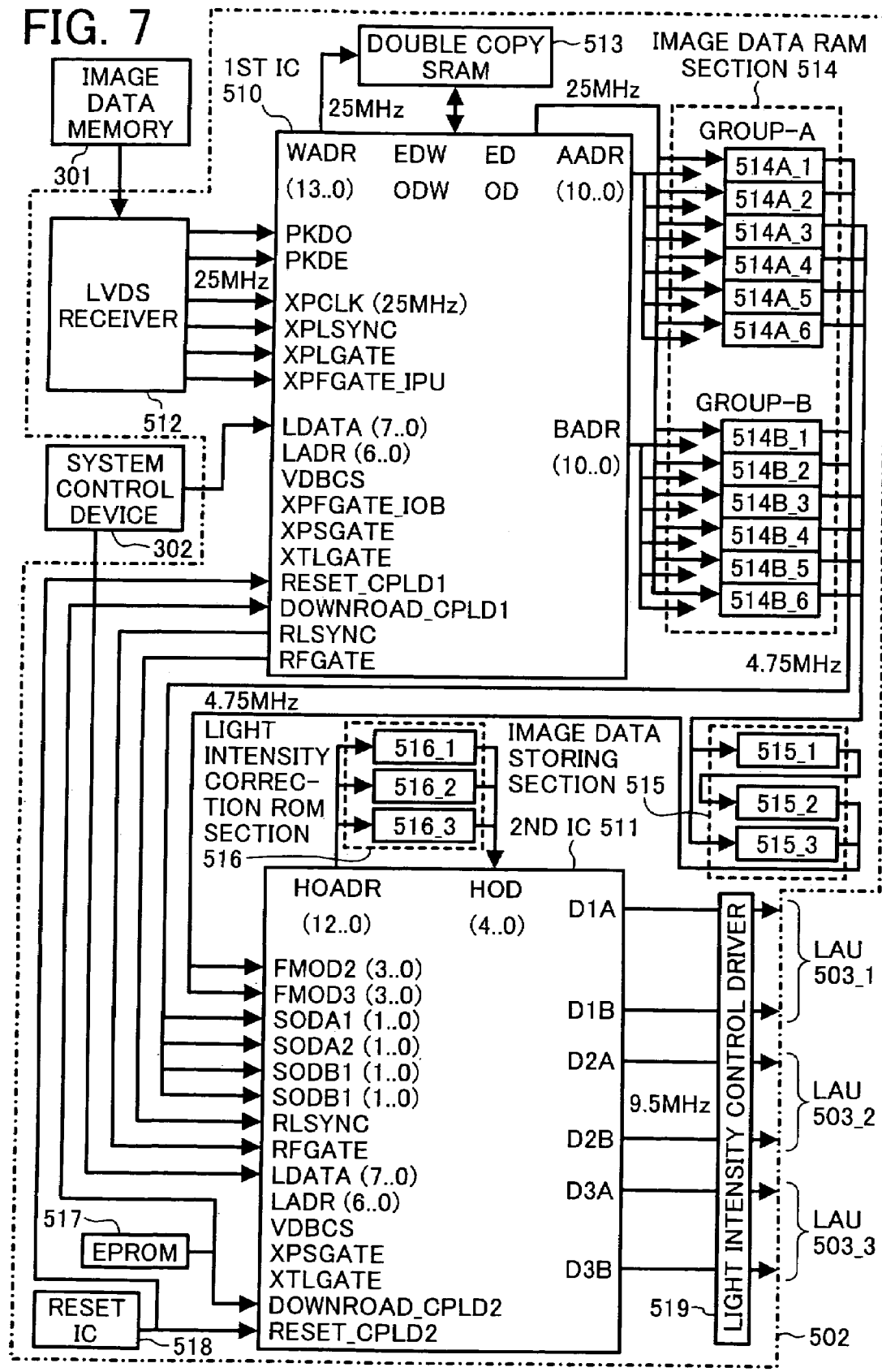
FIG. 7 is an exemplary LED writing control circuit of the image forming apparatus having the optical-writing apparatus according to an exemplary embodiment of the present invention.

Hereinafter, with reference to FIG. 7, each section of the LED writing control circuit 502 will be explained.

The LED writing control circuit 502 includes a first IC (integrated circuit) 510, a second IC (integrated circuit) 511, an LVDS (low voltage differential signaling) receiver 512, a double copy SRAM (static random access memory) 513, an image data RAM (random access memory) section 514, an image data storing section 515, a light intensity correction ROM (read only memory) section 516, an EPROM (erasable programmable read only memory) 517, a reset circuit 518, and a light intensity control driver 519.

Binary image data formed of even data (E) and odd data (O) stored in the image data memory 301 and a timing signal are converted into serial data from parallel data using a LVDS (low voltage differential signaling) driver (not shown), and are transmitted to the LVDS receiver 512 in the LED writing control circuit 502 at a frequency of 25 MHz, for example. The LVDS receiver 512 converts the serial data to parallel data of PKDE (even data of image data), PKDO (odd data of image data), XPCLK (clock signal for transferring input image), XPLSYNC (main scanning area signal), XPLGATE (main scanning effective image area signal), XPFGATE_IPU (image transfer period signal), and outputs these signals to the first IC 510.

Timing signals of XPLSYNC and XPFGATE_IPU are synchronized with an internal clock signal of the first IC 510, and generated as RLSYNC (main scanning area signal synchronized with internal clock signal) and RFGATE (image transfer period signal synchronized with internal clock signal). The signals of RLSYNC and RFGATE are input to the second IC 511, and used as data reading initiation signals for reading data from group-A SRAMs and group-B SRAMs. The group-A SRAMs and group-B SRAMs will be explained later.

Hereinafter, the image data RAM section (random access memory) section 514 will be explained.

The image data RAM section 514 includes six group-A SRAMs (static random access memory) 514A_1 to 514A_6 and six group-B SRAMs 514B_1 to 514B_6.

The first IC 510 receives image data, and outputs the image data as ED (even data) and OD (odd data) with an SRAM address signal AADR (10 . . . 0) to the six group-A SRAMs 514A_1 to 514A_6, or with an SRAM address BADR (10 . . . 0) to the six group-B SRAMs 514B_1 to 514B_6, at a frequency of 25 MHz, for example.

In an exemplary embodiment of the present invention, a total number of dots provided by the LAUs 503_1 to 503_3 is 23,040 calculated by multiplying 7,680 dots per LAU (i.e., one A3 width) with three (i.e., 7,680×3=23,040), wherein the one dot represents one LED.

Each of the LAUs 503_1 to 503_3 includes two parts therein (hereinafter referred to as a 1st division and 2nd division), in which each of the 1st division and 2nd division of the LAUs 503_1 to 503_3 has 3,840 dots (i.e., 7,680/2=3,840).

In an exemplary embodiment of the present invention, the 1st division and 2nd division of the LAUs 503_1 corresponds to the SRAMs 514A_1 and 514A_2, respectively, the 1st division and 2nd division of the LAUs 503_2 corresponds to the SRAMs 514A_3 and 514A_4, respectively, and the 1st division and 2nd division of the LAUs 503_3 corresponds to the SRAMs 514A_5 and 514A_6, respectively. In a similar way, the 1st division and 2nd division of the LAUs 503_1 corresponds to the SRAMs 514B_1 and 514B_2, respectively, the 1st division and 2nd division of the LAUs 503_2 corresponds to the SRAMs 514B_3 and 514B_4, respectively, and the 1st division and 2nd division of the LAUs 503_3 corresponds to the SRAMs 514B_5 and 514B_6, respectively.

In an exemplary embodiment of the present invention, the image data transmitted from the image data memory 301 to the LED writing control circuit 502 are divided into six portions, and each portion is transmitted to each of the 1st division and 2nd division of the LAUs 503_1 to 503_3.

Under such a configuration, two-dot image data (ED: one bit, OD: one bit) output from the first IC 510 are stored as a two-bit image data in a specific address in the SRAM 514A_1. For example, a first two-dot image data for the 1st division of the LAU 503_1 is stored in an address "0" of the SRAM 514A_1, and a second two-dot image data for the 1st division of the LAU 503_1 is stored in an address "1" of the SRAM 514A_1. Such steps are repeated for the SRAMs 514A_1 to 514A_6 until data for one main scanning line are stored in the SRAMs 514A_1 to 514A_6.

In such a way, image data for one main scanning line are stored to the six group-A SRAMs; the SRAM 514A_1 stores a first divided portion of an image data for the 1st division of the LAU 503_1; the SRAM 514A_2 stores a second divided portion of an image data for the 2nd division of the LAU 503_1; the SRAM 514A_3 stores a third divided portion of an image data for the 1st division of the LAU 503_2; the SRAM 514A_4 stores a fourth divided portion of an image data for the 2nd division of the LAU 503_2; the SRAM 514A_5 stores a fifth divided portion of an image data for the 1st division of the LAU 503_3; and the SRAM 514A_6 stores a sixth divided portion of an image data for the 2nd division of the LAU 503_3.

The image data sequentially stored in the six group-A SRAMs 514A_1 to 514A_6 at a frequency of, e.g., 25 MHz are simultaneously read out from the six group-A SRAMs 514A_1 to 514A_6 at a frequency of 4.75 MHz, for example. Similarly, image data sequentially stored in the six group-A SRAMs 514B_1 to 514B_6 at a frequency of, e.g., 25 MHz are simultaneously read out from the six group-B SRAMs 514B_1 to 514B_6 at a frequency of 4.75 MHz, for example.

The image data for the LAU 503_1 read out from the SRAMs 514A_1 and 514A_2 or from the SRAMs 514B_1 and 514B_2 are input to the second IC 511 as SODA1 (1 . . . 0), SODA2 (1 . . . 0), or as SODB1 (1 . . . 0), and SODB2 (1 . . . 0). The image data for the LAU 503_2 read out from the SRAMs 514A_3 and 514A_4 and the image data for the LAU 503_3 read out from the SRAMs 514A_5 and 514A_6 are transmitted to field memories 515_1 to 515_3 in the image data storing section 515. While the image data is being read out from the six group-A SRAMs 514A_1 to 514A_6, image data for a next main scanning line are written in the six group-B SRAMs 514B_1 to 514B_6 in a similar manner for the six group-A SRAMs 514A_1 to 514A_6.

The above-mentioned writing and reading out are toggled between the six Group-A SRAMs 514A_1 to 514A_6 and the six Group-B SRAMs 514B_1 to 514B_6 to link a plurality of adjacent main scanning lines. For example, main scanning lines of odd number such as 1, 3, 5, 7 are controlled by the six group-A SRAMs 514A_1 to 514A_6, and main scanning lines of even number such as 2, 4, 6, 8 are controlled by the six group-B SRAMs 514B_1 to 514B_6, for example.

Hereinafter, the field memories 515_1 and 515_2 in the image data storing section 515 will be explained.

Because the three LAUs 503_1 to 503_3, each of which for example having an A3 width, are arranged in an at-least-two-rows staggered manner, the LAU 503_2 is arranged by displacing it from the LAU 503_1, which is a reference LAU, in a sub-scanning direction by 7 mm, for example, by considering a mechanical configuration in the image forming apparatus.

When the image data output from the six group-A SRAMs 514A_1 to 514A_6 or from the six group-B SRAMs 514B_1 to 514B_6 are simultaneously processed, and simultaneously transmitted to the LAU 503_2 under the above-mentioned mechanical configuration, the LAU 503_2 performs writing with a 7 mm-displacement to the sub-scanning direction with respect to printing by the LAU 503_1.

The 7 mm corresponds to 165 lines, calculated by 7 mm/42.3 µm=165 when 600 dpi (dot per inch) is used (i.e., one dot=25.4 mm/600 dots=42.3 µm).

To correct such a mechanical displacement, the following operations are taken.

Two-bit image data are output from each of the SRAM 514A_3 and SRAM 514A_4 for the LAU 503_2 at a frequency of 4.75 MHz, for example, and written to the field memory 515_1 as four-bit image data with a line-transfer order. Similarly, two-bit image data are output from each of the SRAM 514B_3 and SRAM 514B_4 for the LAU 503_2 at a frequency of 4.75 MHz, for example, and written to the field memory 515_1 as four-bit image data with a line-transfer order.

Such four-bit image data are written to the field memory 515_1 for 100 lines (fixed number), for example, with a line-transfer order.

Next, in the order of image-data writing to the field memory 515_1, the image data are read out from the field memory 515_1 at a frequency of 4.75 MHz, for example, and are written for 65 lines (changeable number) to the field memory 515_2 connected to the field memory 515_1 in a cascade manner.

Next, in the order of image-data writing to the field memory 515_2, the image data are read out from the field memory 515_2 at a frequency of 4.75 MHz, for example, and are output to the second IC 511 as FMOD2 (3 . . . 0).

With above-mentioned operation, the image data for the LAU 503_2 are delayed for 165 lines (i.e., 7 mm).

Because the number of lines to be delayed varies depending on components' precisions of the LAU 503_2 and their assembly precisions, control on a level of one line (i.e., 42.3 µm) is performed.

Hereinafter, the field memories 515_3 in the image data storing section 515 will be explained.

Because the three LAUs 503_1 to 503_3, each of which for example having an A3 width, are arranged in an at-least-two-rows staggered manner, the LAU 503_3 is arranged by displacing it from the LAU 503_1, which is a reference LAU, in a sub-scanning direction by 1 mm, for example, by considering a mechanical configuration in the image forming apparatus.

When the image data output from the six group-A SRAMs 514A_1 to 514A_6 or from the six group-B SRAMs 514B_1 to 514B_6 are simultaneously processed, and simultaneously transmitted to the LAU 503_3 under the above-mentioned mechanical configuration, the LAU 503_3 performs writing with a 1 mm-displacement to the sub-scanning direction with respect to printing by the LAU 503_1.

The 1 mm corresponds to 23 lines, calculated by 1 mm/42.3 µm=23 when 600 dpi (dot per inch) is used (i.e., one dot=25.4 mm/600 dots=42.3 µm).

To correct such a mechanical displacement, the following operations are taken.

Two-bit image data are output from each of the SRAM 514A_5 and SRAM 514A_6 for the LAU 503_3 at a frequency of 4.75 MHz, for example, and written to the field memory 515_3 as four-bit image signal with a line-transfer order. Similarly, two-bit image data are output from each of the SRAM 514B_5 and SRAM 514B_6 for the LAU 503_3 at a frequency of 4.75 MHz, for example, and written to the field memory 515_3 as four-bit image signal with a line-transfer order.

Such four-bit image data are written to the field memory 515_3 for 23 lines (changeable number), for example.

In the order of image-data writing to the field memory 515_3, the image data are read out from the field memory 515_3 at a frequency of 4.75 MHz, for example, and are input to the second IC 511 as FMOD3 (3 . . . 0).

With above-mentioned step, the image data for the LAU 503_3 are delayed for 23 lines (i.e., 1 mm).

Because the number of lines to be delayed varies depending on components' precisions of the LAU 503_3 and their assembly precisions, control on a level of one line (i.e., 42.3 µm) is performed.

Hereinafter, the light intensity correction ROM (read only memory) section 516 will be explained.

The light intensity correction ROM section 516 includes light intensity correction ROMs 516_1 to 516_3. Each of the light intensity correction ROMs 516_1 to 516_3 corresponds to each of the LAUs 503_1 to 503_3. The light intensity correction ROMs 516_1 to 516_3 stores correction data in a multiple-bit format to correct light intensity of each LED. In an embodiment of the present invention, the light intensity correction ROMs 516_1 to 516_3 stores correction data in a 5-bit format, for example.

Figure 8:
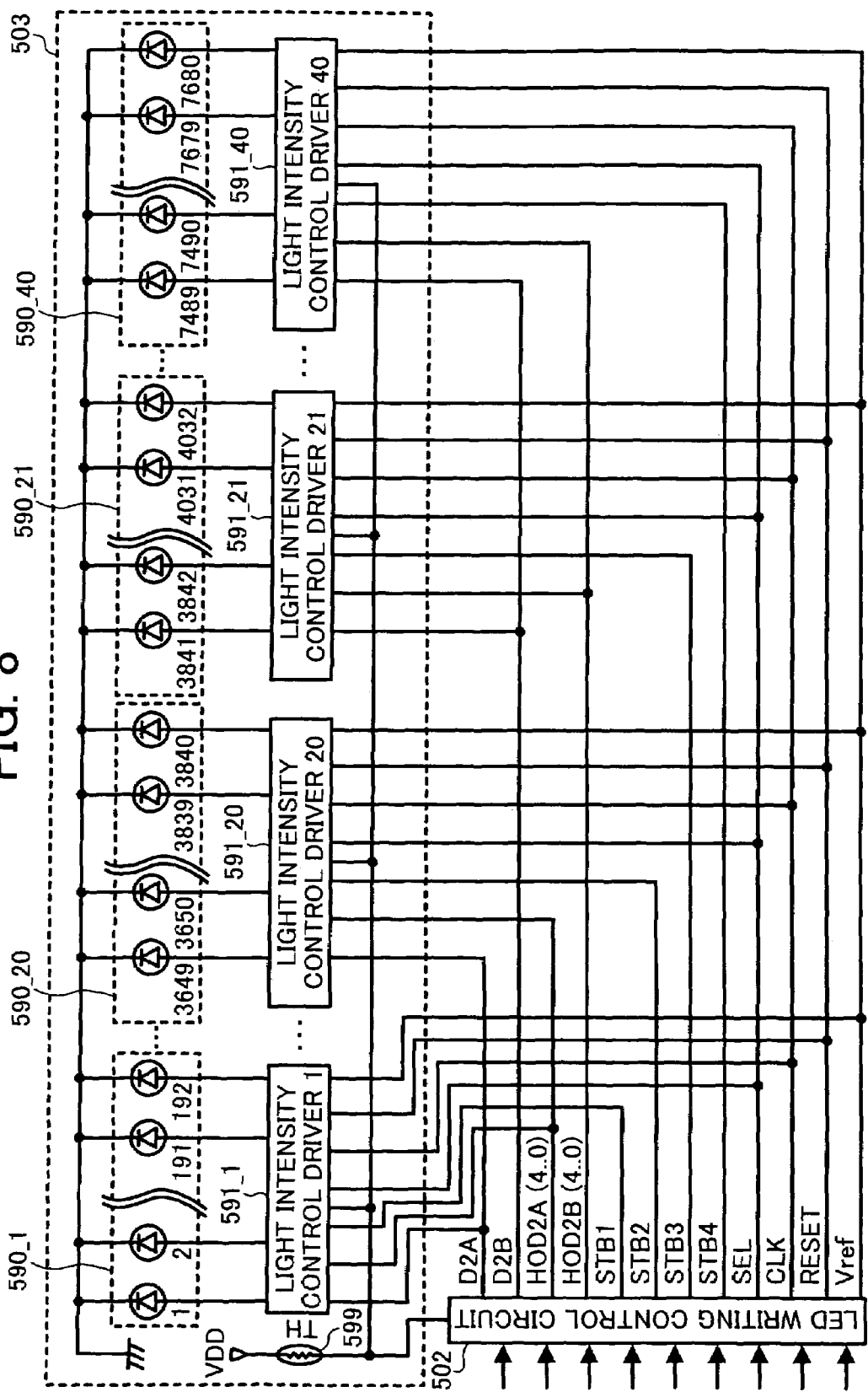
FIG. 8 is an exemplary circuit configuration of one the LAUs.

The 5-bit correction data includes: light intensity correction data for each LED; and light intensity correction data for each light intensity control driver which is provided for each 192-LEDs in one LAU. A relationship between one light intensity control driver and each 192-LEDs is illustrated in FIG. 8 which is explained later.

The light intensity correction data are transmitted to each of the LAUs 503_1 to 503_3 when a power is supplied to the image forming apparatus. When the power is supplied to the image forming apparatus, or when the LED writing control circuit 502 is reset, light intensity correction data for the LAU 503_1 are read out sequentially from 0000H of the light intensity correction ROM 516_1 using an address signal HOADR (12 . . . 0) transmitted from the second IC 511. Then, the light intensity correction data are input to the second IC 511 as HOD (4 . . . 0).

For example, light intensity correction data for the 0000H (i.e., light intensity correction data for the first dot) are latched in the second IC 511, and simultaneously transmitted to the LAU 503_1 with light intensity correction data for 0001H (i.e., light intensity correction data for the 3,841st dot) at a frequency of, e.g., 9.5 MHz in a parallel manner. The above described operations are repeated for 1E28H (i.e., light intensity correction data for 7,680 LEDs and light intensity correction data for 40 light intensity control drivers) to correct the light intensity of the LAU 503_1.

After transmitting the light intensity correction data for the LAU 503_1, light intensity correction data for the LAU 503_2 and LAU 503_3 are sequentially transmitted in a similar manner of the LAU 503_1 to perform light intensity correction for the LAU 503_2 and LAU 503_3.

The transmitted light intensity correction data are erased from the LAUs 503_1 to 503_3 only when a power supply to the LAUs 503_1 to 503_3 is terminated.

Hereinafter, the double copy SRAM 513 will be explained.

An image forming apparatus according to an exemplary embodiment of the present invention can form two same images having up to 420 mm length (i.e., A2 size) in a main scanning direction on a transfer sheet having a maximum length of 841 mm (i.e., A0 size) to improve productivity of the image forming apparatus such as copier and printer by two folds, for example.

When performing the above-mentioned double copy, the same image data are transmitted twice; that is, binary image data (E, O) are transmitted from the image data memory 301 to the LED writing control circuit 502 within a half period of the XPLSYNC (a period for one main scanning line). In such a way, a same image data is transmitted twice in one XPLSYNC for the double copy operation.

The image data (E, O) is transmitted from the image data memory 301 to the first IC 510 at a frequency of 25 MHz, for example.

The first IC 510 outputs the image data "E" and "O" as "EDW (even data for double copy)" and "ODW (odd data for double copy)" to a double copy SRAM 513 with an address signal WADR (13 . . . 0). The first IC 510 simultaneously writes the image data "EDW" and "ODW" to the double copy SRAM 513 and the image data "ED" and "OD" to the six group-A SRAMs 514A_1 to 514A_6.

Upon the double copy SRAM 513 completes storing the image data "EDW" and "ODW", the image data "EDW" and "ODW" stored in the double copy SRAM 513 are read out and transmitted to the first IC 510, and are written to the six group-A SRAMs 514A_1 to 514A_6 in a similar manner as the image data "ED" and "OD." In this way, the six group-A SRAMs 514A_1 to 514A_6 also store image data of a main scanning line for double copy.

The above-mentioned writing and reading out are toggled between the six group-A SRAMs 514A_1 to 514A_6 and the six group-B SRAMs 514B_1 to 514B_6 to link a plurality of adjacent main scanning lines.

Hereinafter, the light intensity control driver 519 will be explained.

A plurality of two-dot image data for the LAUs 503_1 to 503_3 are input to the second IC 511, and synthesized in the second IC 511. The second IC 511 transmits a first divided image data and second divided image data for the LAU 503_1 as D1A and D1B, respectively, a third divided image data and fourth divided image data for the LAU 503_2 as D2A and D2B, respectively, and a fifth divided image data and sixth divided image data for the LAU 503_3 as D3A and D3B, respectively, with a timing signal. These image data are transmitted to the light intensity control driver 519, and further transmitted to each of the LAUs 513_1 to 513_3 at a frequency of 9.5 MHz, for example.

Hereinafter, the EPROM (erasable programmable read-only memory) 517 used for downloading a writing-control program will be explained.

Because the first IC 510 and the second IC 511 are SRAM type CPLDs (complex programmable logic devices), the writing-control program stored in the first IC 510 and the second IC 511 are erased by terminating a power supply to the first IC 510 and the second IC 511. Accordingly, the EPROM 517 downloads (i.e., configures) the writing-control program every time when a power is supplied to the image forming apparatus. Specifically, when the power is supplied to the image forming apparatus, the EPROM 517 downloads the writing-control programs to the first IC 510 by transmitting serial data DOWNROAD_CPLD1 to the first IC 510. Upon the EPROM 517 completing downloading to the first IC 510, the EPROM 517 downloads the writing-control programs to the second IC 511 by transmitting serial data DOWNROAD_CPLD2 to the second IC 511.

Hereinafter, the reset circuit 518 will be explained.

The reset circuit 518 outputs system reset signals RESET_CPLD1 and RESET_CPLD2 when a power is supplied to the image forming apparatus, or when a power voltage supplied to the LED writing control circuit 502 drops. The reset circuit 518 transmits the system reset signals RESET_CPLD1 and RESET_CPLD2 to the first IC 510 and the second IC 511, respectively. Using the system reset signals RESET_CPLD1 and RESET_CPLD2, internal counters of the first IC 510 and the second IC 511 are reset to default system conditions of the image forming apparatus.

Hereinafter, the system control device 302 will be explained.

The system control device 302 controls writing conditions for the LED writing control circuit 502 such as double copy, sheet size, or the like, by transmitting a control-signal input data bus LDATA (7 . . . 0), an address bus data LADR (6 . . . 0), a latch signal VDBCS, and image transfer signals XPFGATE_IOB, XPSGATE, XTLGATE to the first IC 510 and the second IC 511.

Figure 9:
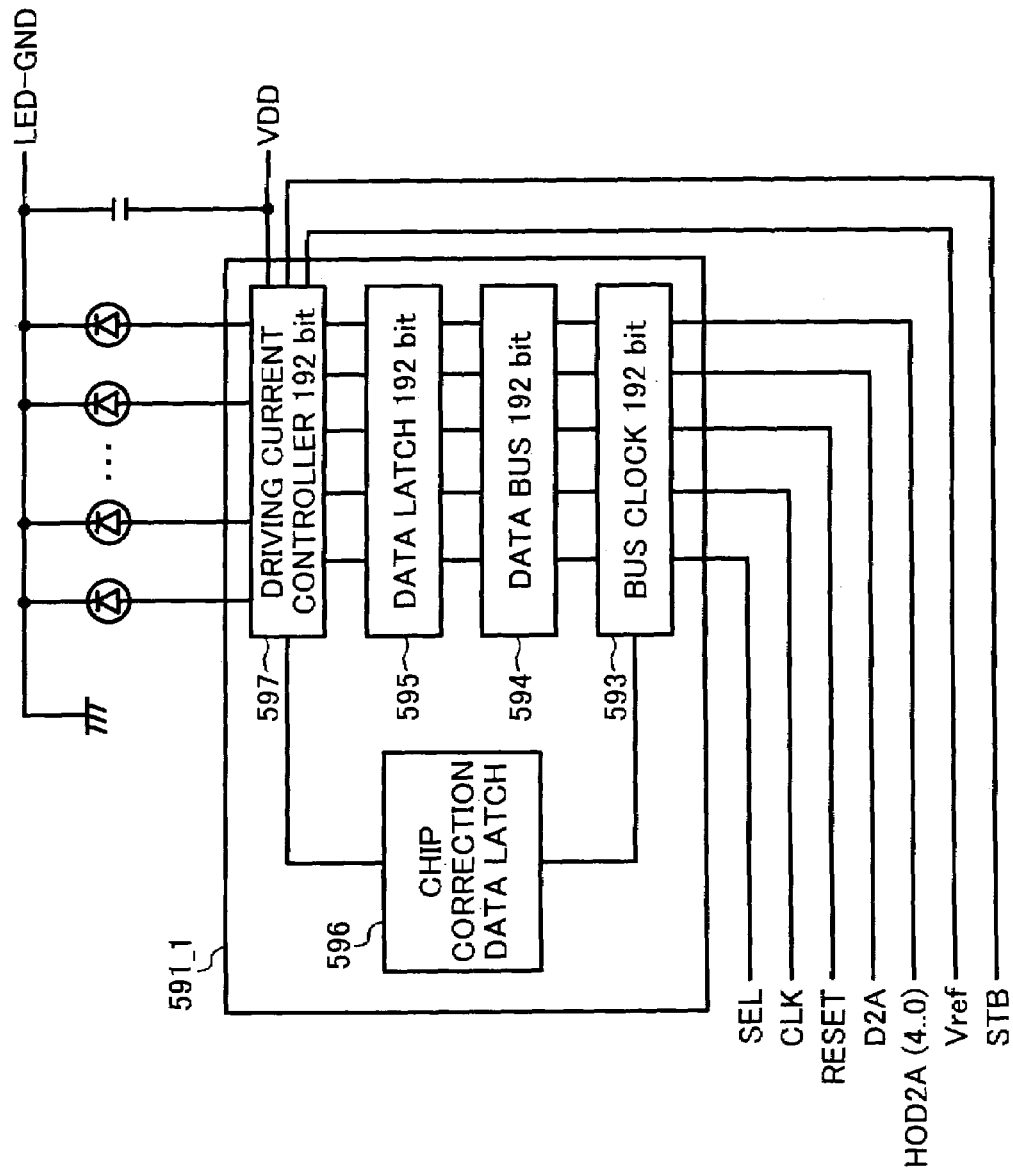
FIG. 9 is an exemplary circuit configuration of a light intensity control driver for the LAUs.

Hereinafter, with reference to FIGS. 8 and 9, the LAUs 503_1 to 503_3 will be explained. With reference to FIG. 8, the LAU 503_2 will be explained as a representative LAU.

The LAU 503_2, as an example, includes 7,680 LEDs arranged with equal spacing from each other in a main scanning direction. The LEDs are grouped in 40 groups, wherein each group has 192 LEDs, and the 40 groups are designated as LED groups 590_1 to 590_40. Light intensity control drivers 591_1 to 591_40 are provided to the LED groups 590_1 to 590_40, respectively, and are connected to the LEDs as illustrated in FIG. 8.

As illustrated in FIG. 8, a first light intensity control drivers group 591_1 (591_1 to 591_10) receives a strobe signal STB1, a second light intensity control drivers group 591_20 (591_11 to 591_20) receives a strobe signal STB2, a third light intensity control drivers group 591_21 (591_21 to 591_30) receives a strobe signal STB3, and a fourth light intensity control drivers group 591_40 (591_31 to 591_40) receives a strobe signal STB4, in which each strobe signal is used to light LEDs during a time when the strobe signal is supplied to the LEDs via the light intensity control drivers 591_1 to 591_40. The light intensity control drivers 591_1 to 591_40 also receive the following signals as input signals: a clock signal CLK for data transfer; a reset signal RESET (LOAD) that initiates data transfer; and a SEL signal that switches between the light intensity correction data and image data.

Furthermore, a chip thermistor 599 is provided to a heat sink (not shown) or a printed board (not shown) for the LAU, and is connected to the light intensity control drivers 591_1 to 591_40 to control a temperature detection unit (not shown) and LED emitting current, for example. The LED writing control circuit 502 also receives a voltage signal from the chip thermistor 599 to monitor temperature of the heat sink (not shown) or the printed board (not shown) for the LAU. Based on the monitored temperature, the LED writing control circuit 502 corrects a driving current for the LAUs using a Vref signal.

In an exemplary embodiment according to the present invention, an LAU is divided into two parts: a first part is from the 1st to 3840th dot; and a second part is from the 3841st to 7680th dot. Image signals D2A and D2B are simultaneously transferred to the light intensity control drivers 591_1 to 591_20 corresponding to the first part (1st to 3840th dot), and to the light intensity control drivers 591_21 to 591_40 corresponding to the second part (3841st to 7680th dot), respectively, and latched in the light intensity control drivers 591_1 to 591_40.

Light intensity correction data HOD2A and HOD2B for correcting light intensity of each LED are expressed in a 5-bit format (i.e., 32 gradations). The light intensity correction data are output from the light intensity correction ROMs 516_1 to 516_3, and are transmitted to the light intensity control drivers 591_1 to 591_40 via the LED writing control circuit 502.

Hereinafter, with reference to FIG. 9, an internal circuit configuration of the light intensity control drivers 591_1 to 591_40 will be explained by referring to the light intensity control driver 591_1 as a representative light intensity control driver.

The light intensity control driver 591_1 includes a bus clock 593, a data bus 594, a data latch 595, a chip correction data latch block 596, and a driving current controller 597.

The SEL signal, D2A (image signal), HOD2A (light intensity correction data), clock signal CLK, reset signal RESET transmitted from the LED writing control circuit 502 are input to the bus clock 593 in the light intensity control driver 591_1.

The SEL signal is used to switch between an LED light intensity correction data transfer mode when a power is supplied to the image forming apparatus and an image data transfer mode.

The light intensity correction data received by the bus clock 593 is transmitted to the chip correction data latch block 596, while the image data D2A received by the bus clock 593 are transmitted to the data bus 594.

The image data D2A output from the data bus 594 are latched in the data latch 595, and the latched image data D2A are transmitted to the driving current controller 597.

In the driving current controller 597, the LED driving current is corrected using the Vref signal upon detecting a change of temperature of the heat sink (not shown) or the printed board (not shown) for the LAU, and the light intensity correction data are modified. Then, the LEDs emit light using the STB signals.

Hereinafter, an emission control method for LEDs provided to an overlapping portion of the adjacent LAUs will be explained based on the above-mentioned overall configuration of the image forming apparatus, the LED writing control circuit 502, the LAUs 503, and the light intensity control drivers 591.

Figure 2:
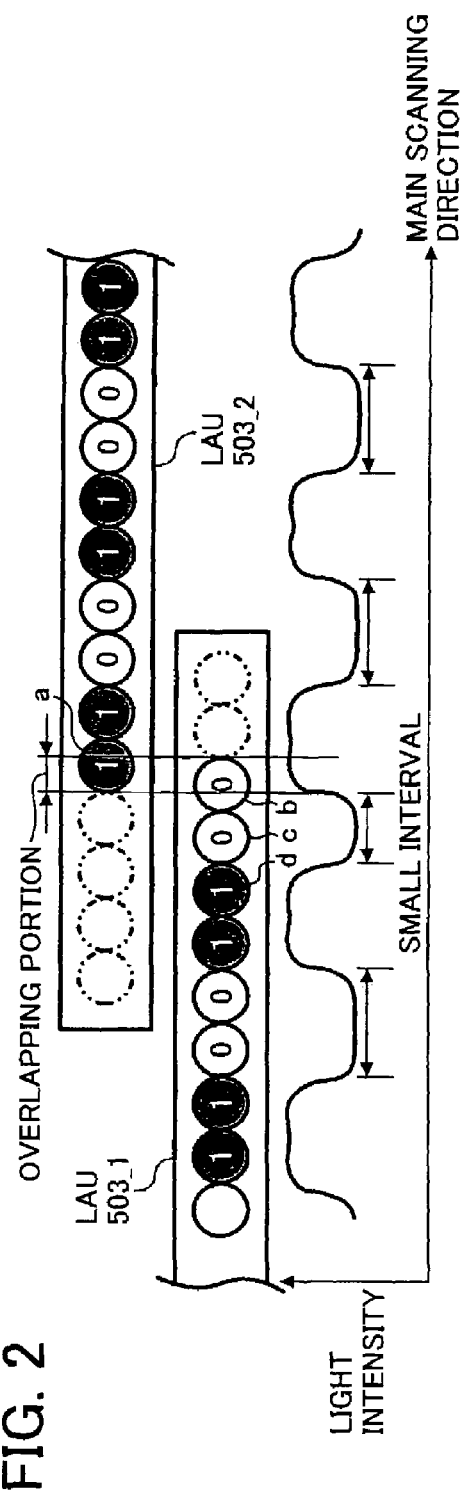
FIG. 2 is an exemplary enlarged view of an overlapping portion of the adjacent LAUs arranged in the at-least-two-rows staggered manner in FIG. 1, and an exemplary state that only a light-emitting element at the overlapping portion in one LAU emits light.

As explained with reference to FIGS. 2, 3, and 4 in the background of the invention, a background image forming apparatus using a plurality of LAUs arranged in an axial direction (i.e., main scanning direction) of the photoconductive member in a staggered manner has a drawback of generating a "black streak" on a formed image.

In an exemplary embodiment according to the present invention, light intensity correction is performed to a plurality of dots provided around the overlapping portion in addition to the overlaying dots "a" and "b" at the overlapping portion to prevent the above-mentioned drawback at the overlapping portion of the adjacent LAUs.

Specifically, to correct light intensity of the dots (i.e., LEDs), light intensity correction data expressed in a five-bit format are provided so that the light intensity correction data can be changed to 32 gradations. Based on an overlapping degree of the dots "a" and "b," the light intensity correction data for the dots "a" and "b" and the plurality of dots provided around the dots "a and b" are modified. Based on the modified light intensity correction data, a driving current is controlled to compensate an emission condition of dots (i.e., LEDs) at the overlapping portion. The light intensity correction data, used to correct light intensity of each LED so that a light intensity of the LAUs as a whole is corrected, can be stored in the light intensity correction ROMs 516_1 to 516_3. The light intensity correction data are transmitted from the light intensity correction ROMs 516_1 to 516_3 to the LAUs 503_1 to 503_3 when a power is supplied to the LAUs 503_1 to 503_3. The LAUs 503_1 to 503_3 may be provided with a memory such as an EEPROM (electrically erasable programmable read only memory) therein.

Hereinafter, an exemplary control method for the dots (i.e., LEDs) at an overlapping portion will be explained with reference to FIG. 1.

At first, an overlaying dot at the overlapping portion is selected. According to an exemplary embodiment of the present invention, a dot at the most left end of the LAU 503_2 is designated as the first dot, and a 69th dot and a 7,612th dot of the LAU 503_2 are determined as overlaying dots. The 69th dot is located at the overlapping portion between the LAU 503_2 and the LAU 503_1, and the 7,612th dot is located at the overlapping portion between the LAU 503_2 and the LAU 503_3.

Light intensity correction data for a plurality of dots provided around the 69th and 7,612th dot are also modified in addition to the 69th and 7,612th dot. Specifically, in an exemplary embodiment of the present invention, light intensity correction data for the 69th to 72nd dot and the 7,609th to 7,612th dot in the LAU 503_2 are modified.

As for the 69th to 72nd dot and the 7,609th to 7,612th dot, modification of the light intensity correction data are performed as follows using a counter in the second IC 511.

The overlaying dots and the plurality of dots provided around the overlaying dots in the LAU 503_2 are detected using the counter in the second IC 511.

For example, when the counter in the second IC 511 detects the 69th dot during the counting, light intensity correction data for the 69th dot are read out from the light intensity correction ROMs 516_1 to 516_3 storing light intensity correction data, and transmitted to the second IC 511. Light intensity correction data is modified corresponding to an overlapping degree of overlaying dots. The modified light intensity correction data are transmitted to the LAU 503_2.

The above-mentioned data modification is controlled by the system control device 302 using register settings such as LADR, LDATA.

For example, assume that a light intensity correction data for the 69th dot is expressed in five-bits (e.g., 10001 in binary number), and a request of lowering light intensity of the 69th dot is given. In this case, a value obtained by subtracting the lowest digit of the above-mentioned binary number (i.e., 10001) by one, that is "10001−1=10000," is transmitted to the LAU 503_2.

Light intensity correction data for dots after the 69th dot are modified in a similar manner.

The above-mentioned "modification of light intensity correction data" may be performed by selecting appropriate light intensity correction data sets, corresponding to overlapping degree of the overlaying dots and stored in the light intensity correction ROMs 516_1 to 516_3 in advance, for example.

As described above, a "black streak" at the overlapping portion can be compensated by modifying the light intensity correction data for the overlaying dots at the overlapping portion and the plurality of dots provided around the overlaying dots. The light intensity correction data for the 69th to 72nd dot can be modified to any value expressed in a five-bit format. Thus, a gradational light intensity correction corresponding to an overlapping degree of overlaying dots can be performed.

For example, assume an overlapping degree of "Level 1" when overlaying dots overlap a little. In this case, light intensity correction data for the 69th dot is set to "01000", and light intensity correction data for the 70th dot is set to "01100" in binary number using five-bits, for example. In a similar way, light intensity correction data for the 71st dot is set to "01110", and light intensity correction data for the 72nd dot is set to "01111" in binary number using five-bits, for example.

As another example, assume an overlapping degree of "Level 10" when overlaying dots overlap significantly. In this case, light intensity correction data for the 69th dot is set to "00001", and light intensity correction data for the 70th dot is set to "00011" in binary number using five-bits, for example. In a similar way, light intensity correction data for the 71st dot is set to "00111", and light intensity correction data for the 72nd dot is set to "01111" in binary number using five-bits, for example.

Although explanations for "Levels 2 to 9" are omitted from the above discussion, light intensity correction data settings are proportionally increased corresponding to the number of the level because the overlapping degree of overlaying dots increases as the number of level increases.

By preparing light intensity correction data as a table menu having ten levels from "Level 1" to "Level 10," for example, level settings can be readily changed via an operation unit such as an operation panel 402 of the operation unit.

In such a way, light intensity at the overlapping portion can be corrected in a simple manner.

In an exemplary embodiment of the present invention, light intensity correction data for dots (i.e., LEDs) provided within a four-dot range from the overlaying dots are modified. However, the number of dot to be controlled are not limited to four, but the number of dots to be controlled may be five or more.

Numerous additional modifications and variations are possible in light of the above teachings. It is therefore to be understood that within the scope of the appended claims, the disclosure of the present invention may be practiced otherwise than as specifically described herein.

The invention may be conveniently implemented using a conventional general purpose digital computer programmed according to the teachings of the present specification, as will be apparent to those skilled in art in the computer art. Appropriate software coding can readily be prepared by skilled programmers based on the teachings of the present disclosure, as will be apparent to those skilled in art in the software art. The present invention may also be implemented by the preparation of application specific integrated circuits or by interconnecting an appropriate network of conventional component circuits, as will be apparent to those skilled in the art.

This application claims priority from Japanese patent applications No. 2003-368602 filed on Oct. 29, 2003 in the Japan Patent Office, the entire contents of which are hereby incorporated by reference herein.

The invention claimed is:

1. An image forming apparatus, comprising:
a plurality of light-emitting element array units configured to cover an area with a predetermined width, each one of the light-emitting element array units comprising a plurality of light-emitting elements, the plurality of light-emitting element array units being arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions;
at least one light intensity control unit configured to control light intensity of the adjacent two overlapping light-emitting elements and other of the plurality of light-emitting elements around the adjacent two overlapping light-emitting elements, based on an overlapping degree of the adjacent two light-emitting elements at each of the overlapping portions; and
an image data transfer unit configured to divide an input image data and to transfer the respective image data divided for each one of the plurality of light-emitting element array units to the each one of the plurality of light-emitting element array units.

2. The image forming apparatus according to claim 1, wherein the predetermined width is a wide format including an A0-sized format.

3. The image forming apparatus according to claim 1, wherein the input image data is expressed in binary format and each bit of the input image data corresponds to each one of the plurality of light-emitting elements in the plurality of light-emitting element array units.

4. The image forming apparatus according to claim 1, wherein the at least one light intensity control unit includes a driving current controller configured to control a driving current to be input to the plurality of light-emitting elements.

5. The image forming apparatus according to claim 1, further comprising at least one light intensity correction unit configured to store a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

6. The image forming apparatus according to claim 5, wherein the light intensity correction data is expressed in a multiple-bit format.

7. The image forming apparatus according to claim 5, wherein the plurality of light intensity correction data sets are prepared by corresponding each one of the plurality of light intensity correction data to the overlapping degree of the adjacent two overlapping light-emitting elements at each of the overlapping portions.

8. The image forming apparatus according to claim 5, wherein the light intensity control unit controls the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

9. An image forming apparatus, comprising:
a plurality of light-emitting element array units configured to cover an area with a predetermined width, each one of the light-emitting element array units comprising a plurality of light-emitting elements, the plurality of light-emitting element array units being arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions;
means for controlling light intensity of the adjacent two overlapping light-emitting elements and other of the plurality of light-emitting elements around the adjacent two overlapping light-emitting elements, based on an overlapping degree of the adjacent two light-emitting elements at each of the overlapping portions; and
means for dividing an input image data and transferring the respective image data divided for each one of the plurality of light-emitting element array units to the each one of the plurality of light-emitting element array units.

10. The image forming apparatus according to claim 9, wherein the predetermined width is a wide format including an A0-sized format.

11. The image forming apparatus according to claim 9, wherein the input image data is expressed in binary format and each bit of the input image data corresponds to each one of the plurality of light-emitting elements in the plurality of light-emitting element array units.

12. The image forming apparatus according to claim 9, wherein the controlling means includes means for controlling a driving current to be input to the plurality of light-emitting elements.

13. The image forming apparatus according to claim 9, further comprising means for storing a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

14. The image forming apparatus according to claim 13, wherein the light intensity correction data is expressed in a multiple-bit format.

15. The image forming apparatus according to claim 13, wherein the plurality of light intensity correction data sets are prepared by corresponding each one of the plurality of light intensity correction data to the overlapping degree of the adjacent two overlapping light-emitting elements at each of the overlapping portions.

16. The image forming apparatus according to claim 13, wherein the means for controlling controls the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

17. A method of image writing by using an image forming apparatus, comprising:
    installing a plurality of light-emitting element array units configured to cover an area with a predetermined width, each one of the light-emitting element array units comprising a plurality of light-emitting elements, the plurality of light-emitting element array units being arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions;
    controlling light intensity of the adjacent two overlapping light-emitting elements and other of the plurality of light-emitting elements around the adjacent two overlapping light-emitting elements, based on an overlapping degree of the adjacent two light-emitting elements at each of the overlapping portions;
    inputting image data to the image forming apparatus;
    dividing the input image data; and
    transferring the respective image data divided for each one of the plurality of light-emitting element array units to the each one of the plurality of light-emitting element array units.

18. The method of image writing by using an image forming apparatus according to claim 17, wherein the predetermined width is a wide format including an A0-sized format.

19. The method of image writing by using an image forming apparatus according to claim 17, wherein the input image data is expressed in binary format and each bit of the input image data corresponds to each one of the plurality of light-emitting elements in the plurality of light-emitting element array units.

20. The method of image writing by using an image forming apparatus according to claim 17, wherein the controlling includes controlling a driving current to be input to the plurality of light-emitting elements.

21. The method of image writing by using an image forming apparatus according to claim 17, further comprising storing a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

22. The method of image writing by using an image forming apparatus according to claim 21, wherein the light intensity correction data is expressed in a multiple-bit format.

23. The method of image writing by using an image forming apparatus according to claim 21, wherein the plurality of light intensity correction data sets are prepared by corresponding each one of the plurality of light intensity correction data to the overlapping degree of the adjacent two overlapping light-emitting elements at each of the overlapping portions.

24. The method of image writing by using an image forming apparatus according to claim 21, wherein the controlling controls the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

25. An optical-writing apparatus, comprising:
    a plurality of light-emitting element array units configured to cover an area with a predetermined width, each one of the light-emitting element array units comprising a plurality of light-emitting elements, the plurality of light-emitting element array units being arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions;
    at least one light intensity control unit configured to control light intensity of the adjacent two overlapping light-emitting elements and other of the plurality of light-emitting elements around the adjacent two overlapping light-emitting elements, based on an overlapping degree of the adjacent two light-emitting elements at each of the overlapping portions; and
    an image data transfer unit configured to divide an input image data and transfer the respective image data divided for each one of the plurality of light-emitting element array units to the each one of the plurality of light-emitting element array units.

26. The optical-writing apparatus according to claim 25, wherein the predetermined width is a wide format including an A0-sized format.

27. The optical-writing apparatus according to claim 25, wherein the input image data is expressed in binary format and each bit of the input image data corresponds to each one of the plurality of light-emitting elements in the plurality of light-emitting element array units.

28. The optical-writing apparatus according to claim 25, wherein the at least one light intensity control unit includes a driving current controller configured to control a driving current to be input to the plurality of light-emitting elements.

29. The optical-writing apparatus according to claim 25, further comprising at least one light intensity correction unit configured to store a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

30. The optical-writing apparatus according to claim 29, wherein the light intensity correction data is expressed in a multiple-bit format.

31. The optical-writing apparatus according to claim 29, wherein the plurality of light intensity correction data sets are prepared by corresponding each one of the plurality of light intensity correction data to the overlapping degree of the adjacent two overlapping light-emitting elements at each of the overlapping portions.

32. The optical-writing apparatus according to claim 29, wherein the light intensity control unit controls the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

33. An optical-writing apparatus, comprising:
a plurality of light-emitting element array units configured to cover an area with a predetermined width, each one of the light-emitting element array units comprising a plurality of light-emitting elements, the plurality of light-emitting element array units being arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions;
means for controlling light intensity of the adjacent two overlapping light-emitting elements and other of the plurality of light-emitting elements around the adjacent two overlapping light-emitting elements, based on an overlapping degree of the adjacent two light-emitting elements at each of the overlapping portions; and
means for dividing an input image data and transferring the respective image data divided for each one of the plurality of light-emitting element array units to the each one of the plurality of light-emitting element array units.

34. The optical-writing apparatus according to claim 33, wherein the predetermined width is a wide format including an A0-sized format.

35. The optical-writing apparatus according to claim 33, wherein the input image data is expressed in binary format and each bit of the input image data corresponds to each one of the plurality of light-emitting elements in the plurality of light-emitting element array units.

36. The optical-writing apparatus according to claim 33, wherein the means for controlling includes means for controlling a driving current to be input to the plurality of light-emitting elements.

37. The optical-writing apparatus according to claim 33, further comprising means for storing a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

38. The optical-writing apparatus according to claim 37, wherein the light intensity correction data is expressed in multiple-bit format.

39. The optical-writing apparatus according to claim 37, wherein the plurality of light intensity correction data sets are prepared by corresponding each one of the plurality of light intensity correction data to the overlapping degree of the adjacent two overlapping light-emitting elements at each of the overlapping portions.

40. The optical-writing apparatus according to claim 37, wherein the means for controlling controls the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

41. A method of image writing by using an optical-writing apparatus, comprising:
installing a plurality of light-emitting element array units configured to cover an area with a predetermined width, each one of the light-emitting element array units comprising a plurality of light-emitting elements, the plurality of light-emitting element array units being arranged in an at-least-two-rows staggered manner in a main scanning direction with overlapping portions overlapping in a sub-scanning direction to include a plurality of light-emitting elements continuously adjacent one to another in the at-least-two-rows staggered manner in the main scanning direction with an adjacent two overlapping light-emitting elements at each of the overlapping portions;
controlling light intensity of the adjacent two overlapping light-emitting elements and other of the plurality of light-emitting elements around the adjacent two overlapping light-emitting elements, based on an overlapping degree of the adjacent two light-emitting elements at each of the overlapping portions;
inputting image data to the optical-writing apparatus;
dividing the input image data; and
transferring the respective image data divided for each one of the plurality of light-emitting element array units to the each one of the plurality of light-emitting element array units.

42. The method of image writing by using an optical-writing apparatus according to claim 41, wherein the predetermined width is a wide format including an A0-sized format.

43. The method of image writing by using an optical-writing apparatus according to claim 41, wherein the input image data is expressed in binary format and each bit of the input image data corresponds to each one of the plurality of light-emitting elements in the plurality of light-emitting element array units.

44. The method of image writing by using an optical-writing apparatus according to claim 41, wherein the controlling includes controlling a driving current to be input to the plurality of light-emitting elements.

45. The method of image writing by using an optical-writing apparatus according to claim 41, further comprising storing a plurality of light intensity correction data sets, each one of the plurality of light intensity correction data sets including a plurality of light intensity correction data, and each bit of the plurality of light intensity correction data corresponding to each one of the plurality of light-emitting elements in each one of the plurality of light-emitting element array units on a one-to-one basis.

46. The method of image writing by using an optical-writing apparatus according to claim 45, wherein the light intensity correction data is expressed in a multiple-bit format.

47. The method of image writing by using an optical-writing apparatus according to claim 45, wherein the plurality of light intensity correction data sets are prepared by corresponding each one of the plurality of light intensity correction data to the overlapping degree of the adjacent two overlapping light-emitting elements at each of the overlapping portions.

48. The method of image writing by using an optically-writing apparatus according to claim 45, wherein the controlling controls the light intensity of at least one light-emitting element at the overlapping portions and at least one other light-emitting element provided to a surrounding region of the at least one light-emitting element at the overlapping portions based on one of the light intensity correction data sets corresponding to the overlapping degree of the adjacent two overlapping light-emitting elements at each of the overlapping portions.

* * * * *